United States Patent
Mansour et al.

(10) Patent No.: US 12,323,965 B2
(45) Date of Patent: Jun. 3, 2025

(54) DYNAMIC RESOURCE ALLOCATION MANAGEMENT RELATING TO WIRELESS ACCESS TECHNOLOGIES ON A COMMON RANGE OF FREQUENCIES

(71) Applicant: T-MOBILE INNOVATIONS LLC, Overland Park, KS (US)

(72) Inventors: Nagi A. Mansour, Arlington, VA (US); Akin Ozozlu, McLean, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 402 days.

(21) Appl. No.: 17/862,076

(22) Filed: Jul. 11, 2022

(65) Prior Publication Data
US 2024/0015728 A1    Jan. 11, 2024

(51) Int. Cl.
*H04W 72/12* (2023.01)
(52) U.S. Cl.
CPC .............................. *H04W 72/1215* (2013.01)
(58) Field of Classification Search
CPC ............. H04W 72/1215; H04W 72/51; H04W 72/512
See application file for complete search history.

(56) References Cited

U.S. PATENT DOCUMENTS

| | | | |
|---|---|---|---|
| 8,031,618 B2 | 10/2011 | Hu | |
| 8,503,383 B2 | 8/2013 | Hu et al. | |
| 8,892,109 B2 | 11/2014 | Panchal et al. | |
| 10,368,246 B2 | 7/2019 | Khambekar et al. | |
| 2021/0235451 A1* | 7/2021 | Parekh | H04W 72/04 |
| 2021/0400497 A1* | 12/2021 | Zhou | H04L 5/0082 |
| 2022/0078806 A1* | 3/2022 | Sevindik | H04W 28/16 |
| 2023/0180031 A1* | 6/2023 | Takeda | H04L 5/0007 370/329 |

OTHER PUBLICATIONS

Samsung, "Dynamic Spectrum Sharing", Technical White Paper, Jan. 2021, pp. 1-27.

* cited by examiner

*Primary Examiner* — Sun Jong Kim
(74) *Attorney, Agent, or Firm* — Shook, Hardy & Bacon L.L.P.

(57) ABSTRACT

Resources allocated and/or requested for use associated with two or more wireless access technologies during a first time period in a first geographic area serve as the basis for a determination of an optimized resource allocation during the first time period in the first geographic area. The resource allocation between the two or more wireless access technologies is modified to the determined optimized resource allocation during a second time period in the first geographic area, the second time period being subsequent to the first time period.

20 Claims, 4 Drawing Sheets

DYNAMIC RESOURCE ALLOCATION MANAGEMENT RELATING TO WIRELESS ACCESS TECHNOLOGIES ON A COMMON RANGE OF FREQUENCIES

SUMMARY

The present disclosure is directed, in part, to systems and methods for managing the optimization of resource allocations between two or more wireless access technologies on a common range of frequencies.

According to various aspects of the technology, an optimized resource allocation between two or more wireless access technologies is determined and a resource allocation between the two or more wireless access technologies is modified during an optimized time period. When a network provider deploys two or more wireless access technologies in the same geographic area, an important consideration is the available bandwidth on which to provide services. Conventionally, a network provider might decide to allocate resources between the two or more wireless access technologies on a common range of frequencies within its already existing bandwidth instead of buying additional bandwidth. The allocation of resources between the two or more wireless access technologies is typically done with a fixed allocation or an allocation that changes dependent upon the current traffic load at an instance in time. To provide better efficiency in resource management and enhanced experience to users, a determined optimization of resource allocation serves as a basis for modifying the resource allocation.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Illustrative embodiments of the present invention are described in detail below with reference to the attached drawing figures, and wherein.

DETAILED DESCRIPTION

Figure 1:
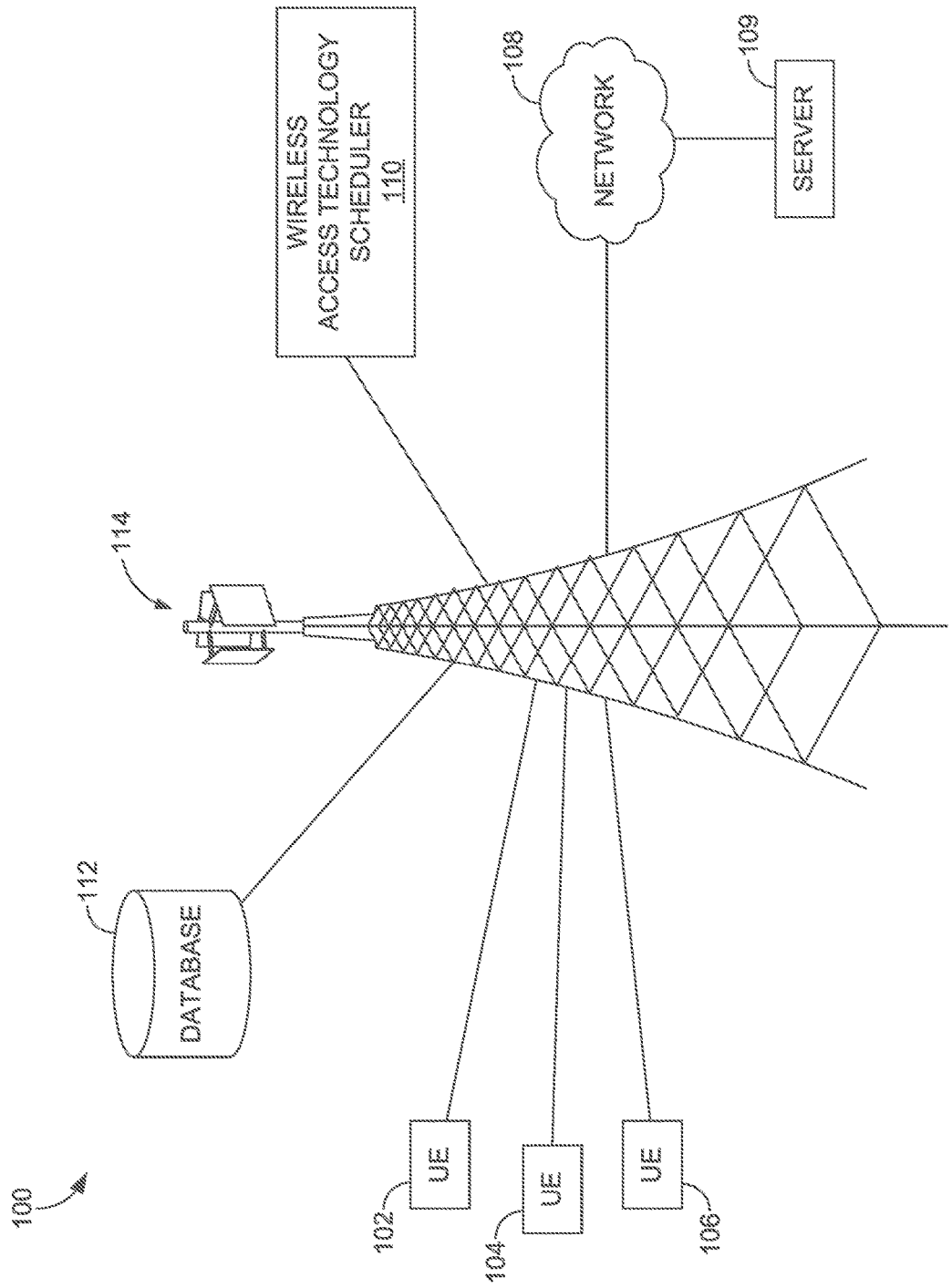
FIG. 1 depicts an exemplary wireless telecommunications network, according to an implementation of an embodiment of the present invention.

The subject matter of embodiments of the invention is described with specificity herein to meet statutory requirements. However, the description itself is not intended to limit the scope of this patent. Rather, the inventor has contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

By way of background, network providers allocate resources between two wireless access technologies using a fixed allocation or an allocation that changes dependent upon the current traffic load at an instance in time. Fixed allocations may be the simplest to implement, however, fixed allocations frequently do not provide the most efficient use of bandwidth. For example, if a wireless access technology is not operating at capacity, the leftover bandwidth becomes an inefficiency. Changing resource allocation between wireless access technologies dependent upon current traffic load (e.g., every 20 ms) at an instant in time may be more efficient than a fixed allocation in some situations but also comes with additional costs. Current forms of managing resource allocation via real-time coordination between more than one wireless access technology are computationally expensive and may cause higher latency in some situations when the transmission prioritizations are determined differently (e.g., LTE and NR). Coordinating in real-time also results in an overall reduction in the traffic capacity of a wireless access technology due to the increased overhead required to manage the coordination. Every time signals are transmitted (e.g., 20 ms), overhead is incurred on the range of frequencies being shared. Even at times when there is no NR DL transmission, there is a minimum overhead incurred.

In order to solve this problem, the present disclosure is directed to systems, methods, and computer readable media for dynamic resource allocation management between multiple wireless access technologies operating on a common range of frequencies. Part of the inventive solution includes using data such as resource allocation between two or more wireless access technologies being provided in a particular area to determine a more efficient allocation of resources to be allocated during a subsequent time period. Analyzing resource allocation or requests for resources by time periods in order to modify the resource allocation during a subsequent time period allows for better efficiency than a fixed allocation when there is a difference in the usage of the wireless access technologies from what was fixedly allocated. Additionally, the overall bandwidth available to the wireless access technologies may be greater during the optimized time periods than what is available when calculating a resource allocation at an instant in time based only upon current traffic load because there may be less overhead bandwidth required. This may result in a more efficient use of bandwidth capacity when the determined optimized resource allocation allows for more bandwidth to be used than what is capable when overhead costs are accounted for. Furthermore, because determining an optimized resource allocation is not dependent only upon current traffic load, a number of other considerations may be involved that may lead to a better user experience. For example, various forms of data analysis (e.g., machine learning) may be used to determine individual time periods to be optimized that take into account current events or user preferences to provide optimized resource allocations during a subsequent time period. In this way, the current invention not only provides efficient traffic load management between multiple wireless access technologies, but can also provide a better user experience by planning ahead of time and making a determination based off of more than current traffic load alone.

Accordingly, a first aspect of the present disclosure is directed to a method for dynamically managing resource allocation between two or more wireless access technologies on a common range of frequencies, the method comprising determining that a first amount of resources are allocated for use associated with a first wireless access technology during a first time period in a first geographic area. The method further comprises determining that a second amount of resources are allocated for use associated with a second wireless access technology during the first time period in the first geographic area. The method further comprises determining an optimized resource allocation between the first wireless access technology and the second wireless access technology for a second time period based on at least the first amount and the second amount of resources allocated during the first time period, wherein the first time period and the second time period are on different days; and modifying the resource allocation between the first wireless access technology and the second wireless access technology to the determined optimized resource allocation in the first geographic area during the second time period, the second time period being subsequent to the first time period.

A second aspect of the present disclosure is directed to a non-transitory computer readable media, having instructions stored thereon, that, when executed by one or more processors, cause the one or more processors to carry out a method for dynamically managing resource allocation between two or more wireless access technologies on a common range of frequencies, the method comprising determining that a first amount of resources are allocated for use associated with a first wireless access technology during a first time period in a first geographic area. The method further comprises determining that a second amount of resources are allocated for use associated with a second wireless access technology during the first time period in the first geographic area. The method further comprises determining an optimized resource allocation between the first wireless access technology and the second wireless access technology for a second time period based on at least the first amount and the second amount of resources allocated during the first time period, wherein the first time period and the second time period are on different days; and modifying the resource allocation between the first wireless access technology and the second wireless access technology to the determined optimized resource allocation in the first geographic area during the second time period, the second time period being subsequent to the first time period.

A third aspect of the present disclosure is directed to a system for dynamically managing resource allocation between two or more wireless access technologies on a common range of frequencies, the system comprising a mobile communications network that includes one or more wireless communication technologies. The system further comprising at least one node configured to provide access to the mobile communications network and a wireless access technology scheduler configured to determining that a first amount of resources are allocated for use associated with a first wireless access technology during a first time period in a first geographic area. The wireless access technology scheduler is further configured to determine that a second amount of resources are allocated for use associated with a second wireless access technology during the first time period in the first geographic area, determine an optimized resource allocation between the first wireless access technology and the second wireless access technology based on at least the first amount and the second amount of resources allocated during the first time period, and modify the resource allocation between the first wireless access technology and the second wireless access technology to the determined optimized resource allocation in the first geographic area during an optimized time period, the optimized time period being subsequent to the first time period.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random-Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 500 shown in FIG. 5. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment (UE). The network may comprise one or more base stations, one or more cell sites (i.e., managed by a base station), one or more cell towers (e.g., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (e.g., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO (massive multiple-input/multiple-output)) as discussed herein.

The terms "user equipment," "UE," and/or "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such. Along similar lines, certain UE are described herein as being "priority" UE and non-priority UE, but it should be understood that in certain implementations UE may be distinguished from other UEs based on any other different or additional features or categorizations (e.g., computing capabilities, subscription type, and the like).

The terms "servicing" and "providing signal coverage," "providing network coverage," and "providing coverage," are interchangeably used to mean any (e.g., telecommunications) service(s) being provided to user devices. Moreover, "signal strength", "radio conditions," "level of coverage," and like, are interchangeably used herein to refer to a connection strength associated with a user device. For example, these terms may refer to radio conditions between a user device and a beam providing coverage to the user device. In particular, the "signal strength," "level of coverage," and like may be expressed in terms of synchronization signal (SS) measurements/values and/or channel state information (CSI) measurements/values. In the context of 5G, signal strength may be measured by user devices, which may communicate the signal strength to the cell site and/or the beam management system disclosed herein. In particular, a user device may report various measurements. For example, a user device may provide signal strength as certain synchronization signal (SS) measurements, such as a SS reference signal received power (SS-RSRP) value/measurement, a SS Reference Signal Received Quality (SS-RSRQ) value/measurement, a SS signal-to-noise and interference ratio (SS-SINR) value/measurement, and/or the like. Alternatively or additionally, in some embodiments, signal strength may also be measured and provided in terms of channel state information (CSI) values.

Referring to FIG. 1, an exemplary network environment suitable for use in implementing embodiments of the present disclosure is provided. Such a network environment as illustrated in FIG. 1 is designated generally as network environment 100. Network environment 100 is simplified to illustrate devices, components, and modules in merely one of many suitable configurations and arrangements, such that configurations and arrangements of devices, components, and modules relative to one another, as well as the and the quantity of each of the devices, components, and modules, can vary from what is depicted (e.g., devices, components, and modules may be omitted and/or could be greater in quantity than shown). As such, the absence of components from FIG. 1 should be not be interpreted as limiting the present invention to exclude additional components and combination(s) of components. Similarly, the computing environment 100 should not be interpreted as imputing any dependency between devices, components, and modules, and nor imputing any requirements with regard to each of the devices, components, modules, and combination(s) of such, as illustrated in FIG. 1. Also, it will be appreciated by those having ordinary skill in the art that the connections illustrated in FIG. 1 are also exemplary as other methods, hardware, software, and devices for establishing a communications link between the components, devices, systems, and entities, as shown in FIG. 1, may be utilized in implementation of the present invention. Although the connections are depicted using one or more solid lines, it will be understood by those having ordinary skill in the art that the exemplary connections of FIG. 1 may be hardwired or wireless, and may use intermediary components that have been omitted or not included in FIG. 1 for simplicity's sake.

Network environment 100 includes user devices 102, 104, and 106, access point 114 (which may be a cell site, node, base transceiver station (also known as a base station), communication tower, a small cell, or the like), network 108, server 109, UE experience analyzing trace manager 110, and database 112. In network environment 100, user devices can take on a variety of forms, such as a personal computer (PC), a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the server 109 or the computing device 400 of FIG. 4) that communicates via wireless communications with the access point 114 in order to interact with a public or private network. In this regard, the user device can be any mobile computing device that communicates by way of a wireless network, for example, a 1× circuit voice, a 3G network (e.g., CDMA, CDMA2000, WCDMA, GSM, UMTS), a 4G network (WiMAX, LTE, HSDPA), a 5G network, or any other type of network.

In some cases, the user devices 102, 104, and 106 in network environment 100 can optionally utilize network 108 to communicate with other computing devices (e.g., a mobile device(s), a server(s), a personal computer(s), etc.) through access point 114. The network 108 may be a telecommunications network(s), or a portion thereof. A telecommunications network might include an array of devices or components (e.g., one or more base stations), some of which are not shown. Those devices or components may form network environments similar to what is shown in FIG. 1, and may perform methods in accordance with the present disclosure. Components, such as terminals, links, and nodes (as well as other components) can provide connectivity in various implementations. Network 108 can include multiple networks, as well as being a network of networks, but is shown in more simple form so as to not obscure other aspects of the present disclosure.

Continuing, network 108 can be part of a telecommunication network that connects subscribers to their immediate service provider. In some instances, network 108 can be associated with a telecommunications provider that provides services to user devices 102, 104, and 106. For example, network 108 may provide voice, SMS, video, or data services to user devices corresponding to users that are registered or subscribed to utilize the services provided by a telecommunications provider. Similarly, network 108 may provide services to user devices that correspond to relays, fixed sensors, internet of things (IoT) enabled devices, or any other device that provide connectivity or data to other devices. Network 108 can comprise any communication network providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network. In aspects, the network 108 may enable communication over both TDD and FDD technology.

Generally, access point 114 is configured to communicate with user devices, such as user devices 102, 104, and 106 that are located within the geographical area, or cell, covered by radio antennas of a cell site (i.e. access point 114). Access point 114 can include one or more base stations (such as a gNodeB), base transmitter stations, radios, antennas, antenna arrays, power amplifiers, transmitters/receivers, digital signal processors, control electronics, GPS equipment, and the like. Access point 114 can include a wireless communications station that is installed at a fixed location, (e.g., a telecommunication tower) or a mobile base station (e.g., small cell) in some embodiments. In some embodiments, access point 114 also includes or is associated with an LTE System Manager (LSM) configured to manage a master list (e.g., a table) of amplitude weights. The list of amplitude weights may include a plurality of amplitude, phase, and power weights applicable to a plurality of antennas, antenna model numbers, radios, tilt angles of antennas, and the like. The listing may also include amplitude, phase, and power weights applicable to various broadcast configurations, such as multi-beam or unified beam.

Illustrative wireless telecommunications technologies include CDMA, CDMA2000, GPRS, TDMA, GSM, WCDMA, UMTS, and the like. A radio might additionally or alternatively facilitate other types of wireless communications including Wi-Fi, WiMAX, LTE, 5G, or other VoIP communications. As can be appreciated, in various embodiments, the radio can be configured to support multiple technologies and/or multiple radios can be utilized to support multiple technologies.

The back-end system can include one or more computing devices or servers 108, which are connected to the RAN. For example, machine-learning algorithms can be leveraged to identify patterns and predict changes in the network environment, including movement patterns of UEs. Machine learning algorithms include Regression algorithms, Instance-Based algorithms, Regularization algorithms, Decision Tree algorithms, Bayesian algorithms, Clustering algorithms, Association Rule Learning algorithms, Artificial Neural Network algorithms, Deep Learning algorithms, Dimensionality Reduction algorithms, Ensemble algorithms, to name a few.

Wireless access technology scheduler ("Scheduler") 110 may exist as a standalone component or may be integrated with another component in network environment 100. The location of Scheduler 110 within network environment 100 is not important as long as it can perform its intended functions. In order to dynamically manage a resource allocation on a common range of frequencies between two or more wireless access technologies (e.g., LTE and NR), an optimized resource allocation is determined for a first geographic area and a first time period. The determined optimized resource allocation is then used to modify the resource allocation between the two or more wireless access technologies for a second time period occurring subsequently to the first time period.

One aspect of the invention involves defining a particular geographic area in which to dynamically manage resource allocation between two or more wireless technologies. In one embodiment, Scheduler 110 may make determinations in a first geographic area which may be an area covered by a single access point 114. However, the first geographic area may comprise more than one access point 114 so as to cover a larger area (e.g., a section of a roadway or a city) when taken together. In some embodiments, the determined optimized resource allocation may be used to modify the resource allocation between two or more wireless access technologies in a second geographic area. The second geographic area may be an area existing within the first geographic area or may be a larger area in which the first geographic area exists. Furthermore, the second geographic area may be a distinctly separate area from the first geographic area with no overlap. In another embodiment, the first geographic area may comprise a plurality of similar areas such as rural areas or city centers that may not necessarily be physically adjacent. The various embodiments discussed in relation to the geographic areas provide ways to implement the invention not only within the same geographic area but can also be extrapolated to other areas.

In addition to geographic areas, at least a first time period is selected to analyze data and make determinations, and a second time period, subsequent to the first time period, is selected to modify the resource allocation to the determined optimized resource allocation. The first time period and the second time period used by Scheduler 110 may vary in the different embodiments discussed in the current disclosure. For example, in one embodiment, the second time period may be a similar time range (e.g., 12:00 pm to 1:00 pm) as the first time period but on a subsequent day. The second time period may also be a subsequent time period occurring on the same day as the first time period. The time periods may be an entire twenty-four hour period or may be shorter such that a day is comprised of more than one time period. In other embodiments, the first time period may span a period of weeks or months or longer (e.g., every Tuesday from 12:00 pm to 1:00 pm for the last year) and the second time period may do similarly. In yet another embodiment, the first time period may be shorter than the second time period. For example, the first time period may be from 12:15 pm to 12:45 pm while the second time period may be from 12:00 pm to 1:00 pm. Further ways that the geographic areas and time periods may be analyzed in relation to determining an optimized resource allocation may be appreciated by one skilled in the art. The current discussion is only to illustrate the invention and provide examples of possible embodiments.

A first geographic area and a first time period may be selected in a variety of ways including by an individual or a machine learning algorithm. Furthermore, it can be appreciated that certain aspects of the invention may be practiced and repeated in order to decide whether a particular geographic area or plurality of user devices would experience better network performance if the resource allocation was dynamically managed as disclosed herein. For example, geographic areas and time periods may be split and analyzed in various overlapping or non-overlapping slices to decide whether a determined optimized resource allocation would make sense to implement. In those situations, the resource allocation would be modified to the determined optimized resource allocation for an area and/or a plurality of user devices.

In order to determine the optimized resource allocation between the first wireless access technology and the second wireless access technology (e.g., LTE and NR), Scheduler 110 determines at least an amount of resources that were allocated and/or requested for use associated with the first and second wireless access technologies. The resources may be allocated by at least one node (e.g., a node of Access Point 114) that is configured to wirelessly communicate with the plurality of user devices using the first and second wireless access technologies. The resources may comprise subframes capable of being occupied by signals of the first and second wireless access technologies within the common range of frequencies. These resources may be allocated divided and allocated to either the first wireless access technology or the second wireless access technology.

Scheduler 110 determines an optimized resource allocation based at least on the amount of resources requested and/or allocated as described above. This allows Scheduler 110 to have usage data between the wireless access technologies over a period of time that can be used to determine an optimized resource allocation for a subsequent period of time. Having this adaptive quality allows Scheduler 110 to be more efficient than a purely fixed allocation without all of the drawbacks of basing an allocation off of current traffic load alone. Scheduler 110 may also make determinations based on one or more of user preferences, historical traffic load data, user device time and location data, and device capabilities. This allows Scheduler 110 the capability to determine an optimized resource allocation that is more fine-tuned and that can result in a greater overall network experience for users. In one embodiment, Scheduler 110 may determine an optimized resource allocation which allocates a greater amount of resources to the first wireless access technology when user preferences and device capabilities are taken into account than would have been allocated otherwise. In this way, the resource allocation optimization may be weighted more towards the user experience which may not always result in the greatest possible efficiency with regard to bandwidth usage. However, there may also be occasions where the aforementioned secondary considerations may be taken into account and result in the resource allocation optimization being more efficient.

After an optimized resource allocation is determined, Scheduler 110 modifies the resource allocation to the determined optimized resource allocation. Scheduler 110 may modify the resource allocation between the wireless access technologies to the determined optimized resource allocation in the first or second geographic area during the second time period. In some embodiments, the determined optimized resource allocation may include an allocation of an entirety of the available resources between the two or more wireless access technologies. In other embodiments, a determined resource allocation may include an allocation of less than the entirety of the available resources. In such embodiments, determining the optimized resource allocation may further comprise allocating remaining resources to one or more of the wireless access technologies being managed by Scheduler 110. In yet other embodiments, the resource allocation may be modified by Scheduler 110 during the optimized time period (e.g., second time period) based on traffic load occurring during the optimized time period. This occurs when the optimized resource allocation comprises a threshold trigger based on traffic load. As such, modifying the resource allocation to the determined optimized resource allocation may include modifying the resource allocation at the beginning of the optimized time period but may also include modifying the resource allocation within the optimized time period.

Figure 2:
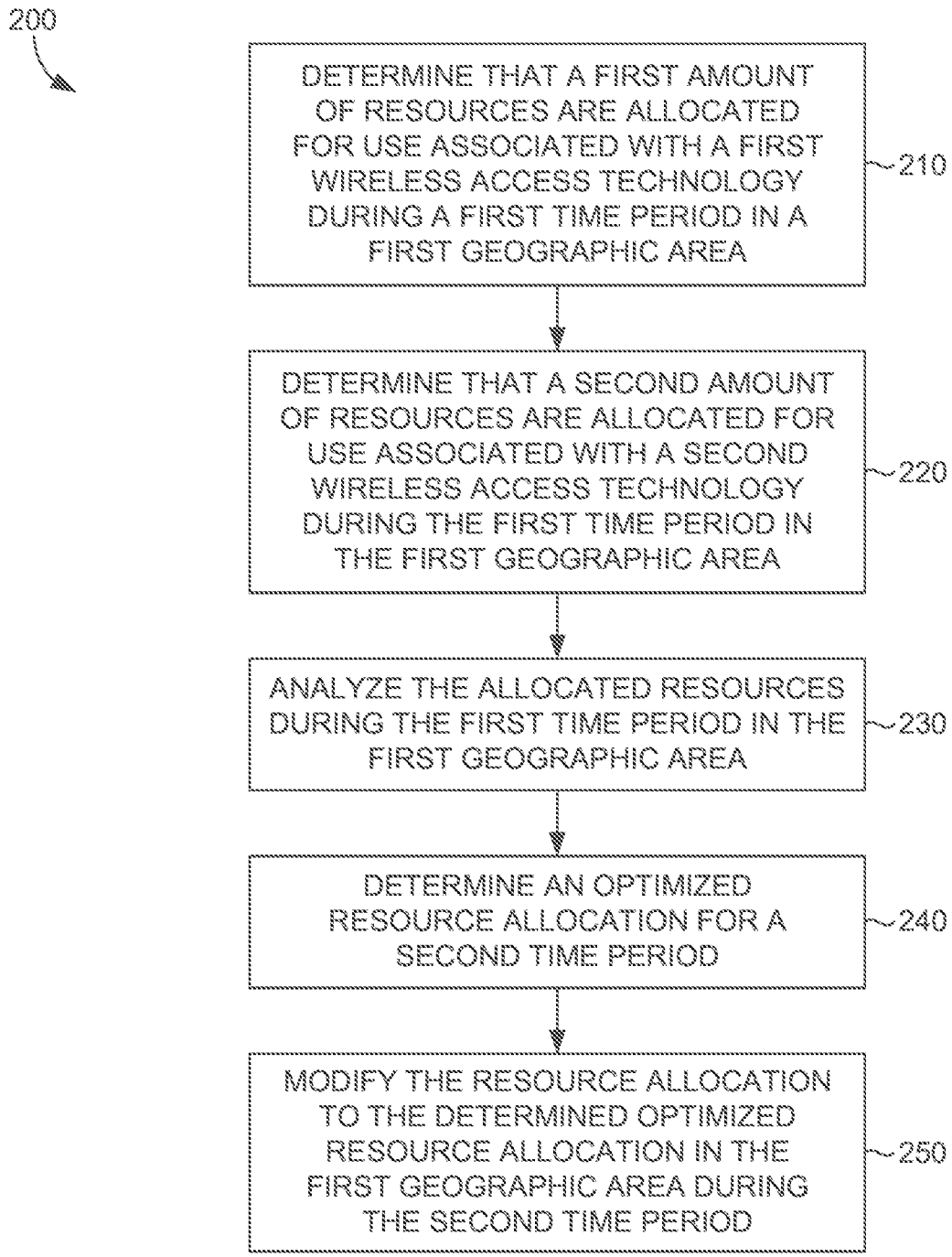
FIG. 2 depicts a flowchart of an exemplary method for dynamic resource allocation management in accordance with embodiments of the present invention.

Now referring to FIG. 2, method 200, described herein, can be implemented using any or all of the components and component interactions previously described in FIG. 1. As such, the method is discussed briefly for brevity, though it will be understood that the previous discussion and details described therein can be applicable to aspects of the methods of FIG. 2. Additionally or alternatively, it will be understood that the method discussed herein can be implemented or performed via the execution of computer-readable instructions stored on computer readable media, by one or more processors.

A flow diagram showing a method 200 for dynamic resource allocation management related to wireless access technologies on a common range of frequencies is provided in accordance with any one or more aspects of the present disclosure. At block 210, a first amount of resources (e.g., subframes within the common range of frequencies) that are allocated (e.g., by at least one node configured to wireless communicate with user devices) for use associated with a first wireless access technology (e.g., LTE) during a first time period in a first geographic area is determined. At block 220, a second amount of resources that are allocated for use associated with a second wireless access technology (e.g., NR) during the first time period in the first geographic area is determined. At block 230, the allocated resources during the first time period in the first geographic area are analyzed. At block 240, an optimized resource allocation for a second time period is determined at least based on the allocated resources during the first time period in the first geographic area. The optimized resource allocation may also be further based on one or more of user preferences, user device time and location data, and device capabilities. At block 250, the resource allocation in the first geographic area during the second time period is modified to the determined optimized resource allocation. The determined optimized resource allocation may further comprise dynamically altering the optimized resource allocation based on traffic load occurring during the optimized time period (e.g., a trigger based on a threshold traffic load exceeding a predetermined limit). As discussed with relation to FIG. 1, a second geographic area is also contemplated in some embodiments.

Figure 3:
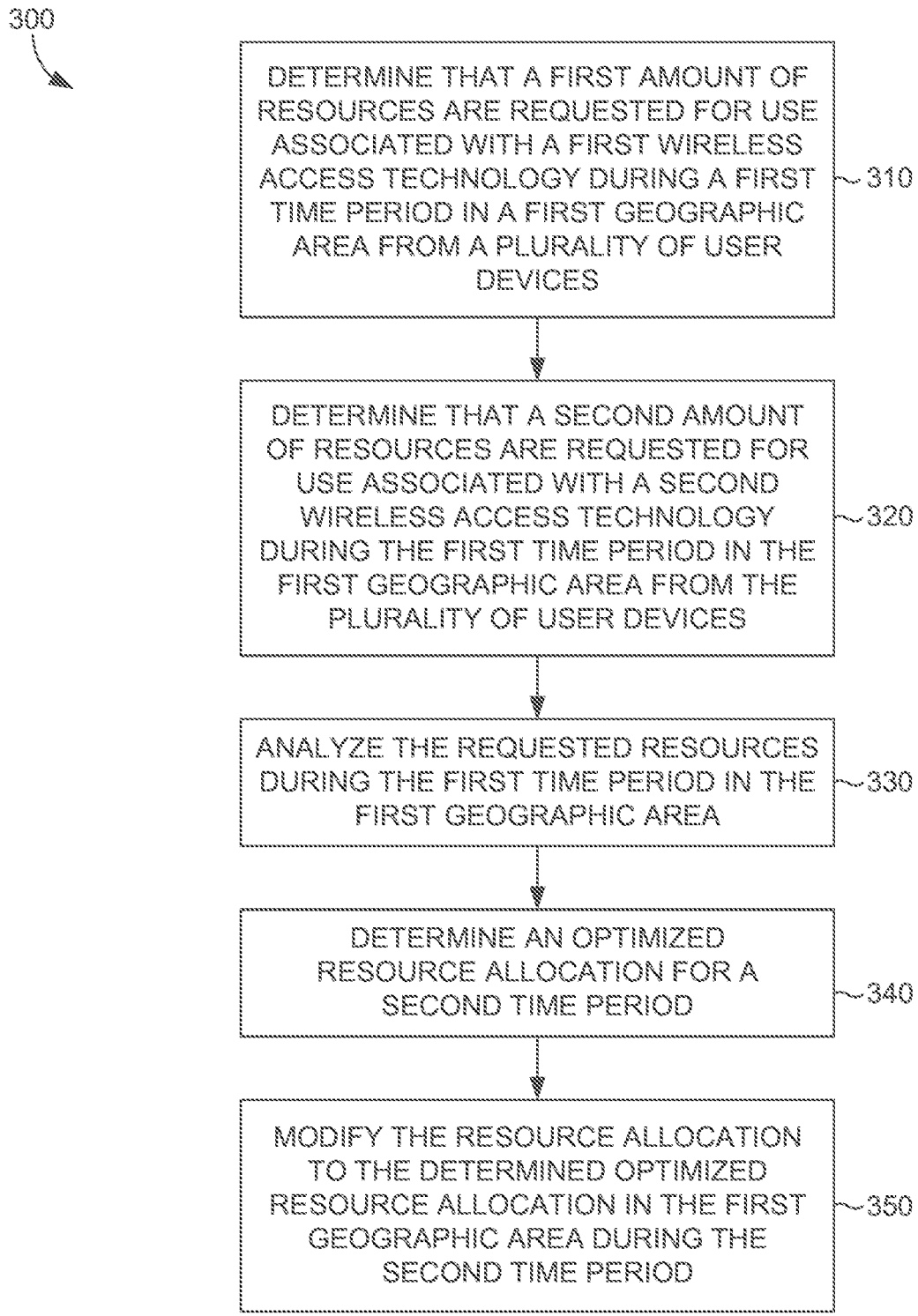
FIG. 3 depicts a flowchart of another exemplary method for dynamic resource allocation management in accordance with embodiments of the present invention.

With reference to FIG. 3, method 300, described herein, can be implemented using any or all of the components and component interactions previously described in FIGS. 1 and 2. As such, the method is discussed briefly for brevity, though it will be understood that the previous discussion and details described therein can be applicable to aspects of the methods of FIG. 3. Additionally or alternatively, it will be understood that the method discussed herein can be implemented or performed via the execution of computer-readable instructions stored on computer readable media, by one or more processors.

A flow diagram showing a method 300 for dynamic resource allocation management related to wireless access technologies on a common range of frequencies is provided in accordance with any one or more aspects of the present disclosure. At block 310, a first amount of resources (e.g., subframes within the common range of frequencies) requested for use (e.g., occupying subframes) associated with a first wireless access technology (e.g., LTE) during a first time period in a first geographic area from a plurality of user devices is determined. At block 320, a second amount of resources requested for use associated with a second wireless access technology (e.g., NR) during the first time period in the first geographic area from the plurality of user devices is determined. At block 330, the requested resources during the first time period in the first geographic area is analyzed. At block 340, an optimized resource allocation for a second time period is determined at least based on the requested resources during the first time period in the first geographic area by the plurality of user devices. The optimized resource allocation may also be further based on one or more of user preferences, user device time and location data, and device capabilities. At block 350, the resource allocation is modified in the first geographic area during the second time period to the determined optimized resource allocation. The determined optimized resource allocation may further comprise dynamically altering the optimized resource allocation based on traffic load occurring during the optimized time period (e.g., a trigger based on a threshold traffic load exceeding a predetermined limit). As discussed with relation to FIG. 1, a second geographic area is also contemplated in some embodiments.

Figure 4:
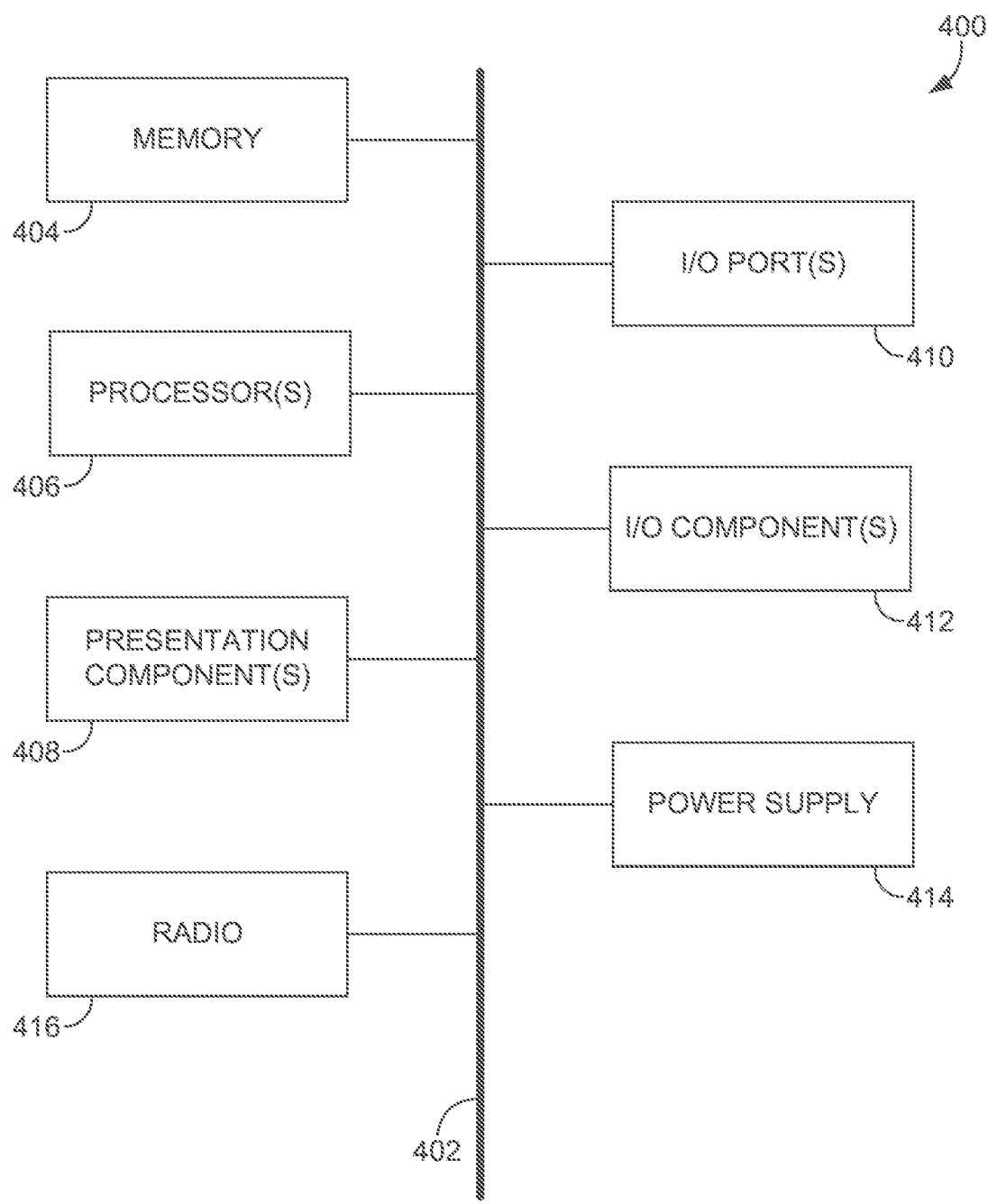
FIG. 4 depicts a block diagram of an exemplary computing environment suitable for use in implementing embodiments herein.

Turning to FIG. 4, computing device 400 includes a bus 402 that directly or indirectly couples the following devices: memory 404, one or more processors 406, one or more presentation components 408, input/output (I/O) ports 410, input/output (I/O) components 412, and an illustrative power supply 414. Bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterate that the diagram of FIG. 4 is merely illustrative of an example computing device that can be used in connection with one or more embodiments of the present invention. Distinction is not made between such categories as "workstation," "server," "laptop," "handheld device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media is non-transitory. In contrast to communication media, computer storage media is not a modulated data signal or any signal per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 404 includes computer-storage media in the form of volatile and/or nonvolatile memory. The memory may be removable, non-removable, or a combination thereof. Example hardware devices include solid-state memory, hard drives, optical-disc drives, etc. Computing device 400 includes one or more processors that read data from various entities such as memory 404 or I/O components 412. Presentation component(s) 408 present data indications to a user or other device. Example presentation components include a display device, speaker, printing component, vibrating component, etc.

I/O ports 410 allow computing device 400 to be logically coupled to other devices including I/O components 412, some of which may be built in. Illustrative components include a microphone, joystick, game pad, satellite dish, scanner, printer, wireless device, etc.

Radio 416 represents a radio that facilitates communication with a wireless telecommunications network. Illustrative wireless telecommunications technologies include CDMA, GPRS, TDMA, GSM, W-CDMA, EDGE, CDMA2000, and the like. Radio 416 might additionally or alternatively facilitate other types of wireless communications including Wi-Fi, WiMAX, LTE, 5G, or other VoIP communications. As can be appreciated, in various embodiments, radio 416 can be configured to support multiple technologies and/or multiple radios can be utilized to support multiple technologies.

The invention claimed is:

1. A method for dynamically managing resource allocation between two or more wireless access technologies on a common range of frequencies, the method comprising:
   determining that a first amount of resources are allocated for use associated with a first wireless access technology during a first preset time period in a first geographic area;
   determining that a second amount of resources are allocated for use associated with a second wireless access technology during the first preset time period in the first geographic area;
   determining, during the first preset time period, an optimized resource allocation between the first wireless access technology and the second wireless access technology for a second preset time period based on at least the first amount and the second amount of resources allocated during the first preset time period, wherein the first preset time period and the second preset time period are on different days; and
   modifying, at a beginning of the second preset time period, a resource allocation between the first wireless access technology and the second wireless access technology to the determined optimized resource allocation in the first geographic area during the second time period, the second preset time period being subsequent to the first preset time period; and
   further modifying the resource allocation between the first wireless access technology and the second wireless access technology to the determined optimized resource allocation in the first geographic area at another time point during the second preset time period when a traffic load in the first geographic area reaches a threshold trigger level.

2. The method of claim 1, wherein determining the optimized resource allocation is further based on one or more of user preferences, historical traffic load data, user device time and location data, and device capabilities.

3. The method of claim 1, wherein the first wireless access technology is long term evolution (LTE) and wherein the second wireless access technology is new radio (NR).

4. The method of claim 1, wherein determining the optimized resource allocation further comprises allocating remaining resources to the first wireless access technology.

5. The method of claim 1, wherein determining the optimized resource allocation further comprises allocating remaining resources to the second wireless access technology.

6. The method of claim 1, wherein determining the optimized resource allocation further comprises allocating remaining resources to both the first wireless access technology and the second wireless access technology.

7. A non-transitory computer readable media, having instructions stored thereon, that, when executed by one or more processors, cause the one or more processors to carry out a method for dynamically managing resource allocation between two or more wireless access technologies on a common range of frequencies, the method comprising:
   based on an analysis of a first geographic area during a first preset time period in overlapping or non-overlapping slices, determining an optimized resource allocation between a first wireless access technology and a second wireless access technology during a second preset time period, the determination comprising:
      determining that a first amount of resources for use associated with the first wireless access technology were requested from a plurality of user devices during the first time preset period in the first geographic area;
      determining that a second amount of resources for use associated with the second wireless access technology were requested from the plurality of user devices during the first time preset period in the first geographic area; and
      determining, during the first preset time period, an optimized resource allocation between the first wireless access technology and the second wireless access technology for a second time preset period based on at least the first amount and the second amount of resources requested during the first time preset period, wherein the first time preset period and the second time preset period are on different days; and
   modifying a resource allocation between the first wireless access technology and the second wireless access technology to the determined optimized resource allocation in the first geographic area during the second time preset period, the second time preset period being subsequent to the first time preset period; and
   further modifying the resource allocation between the first wireless access technology and the second wireless access technology to the determined optimized resource allocation in the first geographic area at another time point during the second preset time period when a traffic load in the first geographic area reaches a threshold trigger level.

8. The method of claim 7, wherein determining the optimized resource allocation is further based on one or more of user preferences, user device time and location data, and device capabilities.

9. The method of claim 7, wherein the first wireless access technology is long term evolution (LTE) and wherein the second wireless access technology is new radio (NR).

10. The method of claim 7, wherein determining the optimized resource allocation further comprises allocating remaining resources not requested to the first wireless access technology.

11. The method of claim 7, wherein determining the optimized resource allocation further comprises allocating remaining resources not requested to the second wireless access technology.

12. The method of claim 7, wherein determining the optimized resource allocation further comprises allocating remaining resources not requested to both the first wireless access technology and the second wireless access technology.

13. The method of claim 7, wherein the first and second amount of requested resources comprise subframes within the common range of frequencies that are allocated to the first wireless access technology or the second wireless access technology.

14. A system for dynamically managing resource allocation between two or more wireless access technologies on a common range of frequencies, the system comprising:
   a mobile communications network that includes two or more wireless communication technologies;

a plurality of access points configured to provide access to the mobile communications network in a first geographic area; and a resource allocation manager configured to:

determining that a first amount of resources are allocated for use associated with a first wireless access technology during a first time preset period in the first geographic area;

determining that a second amount of resources are allocated for use associated with a second wireless access technology during the first time preset period in the first geographic area;

determining an optimized resource allocation between the first wireless access technology and the second wireless access technology based on at least the first amount and the second amount of resources allocated during the first time preset period; and modifying a resource allocation between the first wireless access technology and the second wireless access technology to the determined optimized resource allocation in the first geographic area during an optimized time preset period, the optimized time preset period being subsequent to the first time preset period, wherein each of the plurality of access points provide access to the mobile communications network using the determined optimized resource allocation during the optimized time preset period; and further modifying the resource allocation between the first wireless access technology and the second wireless access technology to the determined optimized resource allocation in the first geographic area at another time point of the optimized preset time period when a traffic load in the first geographic area reaches a threshold trigger level.

15. The method of claim 1, wherein the first time preset period spans a period of a week or longer.

16. The method of claim 1, wherein the first time preset period is shorter than the second time preset period.

17. The method of claim 7, further comprising modifying a resource allocation in a second geographic area based on the determined optimized resource allocation.

18. The method of claim 17, wherein the second geographic area is larger than the first geographic area, and wherein the second geographic area comprises the first geographic area.

19. The method of claim 17, wherein the second geographic area is distinctly separate from the first geographic area.

20. The method of claim 14, wherein the first geographic area comprises a plurality of areas that are not physically adjacent to each other.

\* \* \* \* \*